United States Patent
Chiu

(10) Patent No.: US 7,068,392 B2
(45) Date of Patent: Jun. 27, 2006

(54) APPARATUS AND METHOD OF MAPPING LOOK-UP TABLE IN AN IMAGING SYSTEM

(76) Inventor: Chui-Kuei Chiu, 215, Sec. 1, Heng-Shen St., Hsin-Chu (TW)

( * ) Notice: Subject to any disclaimer, the term of this patent is extended or adjusted under 35 U.S.C. 154(b) by 832 days.

(21) Appl. No.: 09/839,211

(22) Filed: Apr. 23, 2001

(65) Prior Publication Data

US 2002/0154340 A1    Oct. 24, 2002

(51) Int. Cl.
*G06F 15/00* (2006.01)

(52) U.S. Cl. .................. 358/1.9; 358/1.9; 358/443; 358/505; 358/530

(58) Field of Classification Search ............... 358/1.9, 358/443, 505, 530; 364/608, 718
See application file for complete search history.

(56) References Cited

U.S. PATENT DOCUMENTS

| 4,463,380 A | * | 7/1984 | Hooks, Jr. ................... 348/580 |
| 4,482,975 A | * | 11/1984 | King et al. .................... 708/9 |
| 5,896,122 A | * | 4/1999 | MacDonald et al. ........ 345/602 |

* cited by examiner

*Primary Examiner*—Kimberly Williams
*Assistant Examiner*—Michael Burleson
(74) *Attorney, Agent, or Firm*—Berkeley Law & Technology Group, LLC

(57) ABSTRACT

The present invention provides a mapping method and apparatus of look-up table in an imaging system. The mapping method implemented by the apparatus comprises receiving a digital signal having a high-bit portion and a low-bit portion. The high-bit portion of the digital signal is subjected to a curve table for look-up mapping to get a high-bit signal. The partial high-bit portion is subjected to a slope table for getting a factor. The low-bit portion of the digital signal is calculated with the factor to get a low-bit signal. The high-bit signal is combined with the low-bit signal to get an output signal. The curve table and slope curve can reduce the memory usage of the imaging system.

4 Claims, 3 Drawing Sheets

APPARATUS AND METHOD OF MAPPING LOOK-UP TABLE IN AN IMAGING SYSTEM

BACKGROUND OF THE INVENTION

1. Field of the Invention

The invention relates to a method and apparatus for an image capture instrument, and more particularly to a method and apparatus of look-up table (LUT) of a scanner instrument, that enables the reduction of memory size of the look-up table.

2. Description of the Prior Art

Optical scanners are used to capture and digitize images. For example, an optical scanner can be used to capture the image of printed matter on a sheet of paper. The digitized image can then be electronically stored and/or processed with character recognition software to produce ASCII text. The typical optical scanner includes, such as a light source, a linear array of photoelectric sensing elements (generally a CCD sensor), an analog amplifier, an analog-to-digital converter (ADC), a controller and a random access memory (RAM).

As depicted in FIG. 1, each photoelectric sensing element 110 of an imaging system, such as a scanner, converts the light it receives into an electric charge. The magnitude of the charge depends on the intensity of the light and the exposure time. Next, the charges from each of the photoelectric sensing element 110 are converted into analog voltages via the analog amplifier (not shown). The analog voltages are digitized (internal M-bit digital signals) by the analog-to-digital converter 120 for digital image processing and storage in the RAM. One problem with a current scanner is that the internal M-bit digital signals produced by the light-sensing elements are not directly proportional to the intensity of light reflected from the image. In other words, the output of the light-sensing element is non-linear when related to the light input for the full available dynamic range of the sensing element. There is always a sensing element translation between light input and digital internal signal conversion for printer processing. A gamma look-up table 140 that follows a task of shading compensation 130 can implement the translation of the M-bit internal digital signals. Then the output from gamma look-up table 140 is translated into a host through a memory 150.

The look-up table stores predetermined mapping information, that follows a curve (usually, a monotone curve is chosen) and acts as a memory to provide an output each time it receives an address. However, while an input signal has more bits than ever this creates a disadvantage for the utility of the look-up table as the size increases dramatically. Shown in FIG. 2, an input signal $S_I$ follows the format of 16-bits per pixel and 16-bits per pixel for an output signal $S_O$. It is necessary for the gamma look-up table 140 to consume up to 370K bytes to map the input signal $S_1$ into an identity mapping terms for getting the better output signal $S_O$. In order to reduce the cost of the look-up table, interpolation is applied on the mapping of the look-up table. Double period-reading or value-reading are necessary for interpolation, that is disadvantageous to performance of high-speed design. Alternative resolution is to execute the task of mapping in the host. However, the method increases time and memory consumption.

SUMMARY OF THE INVENTION

It is an object of the present invention to provide a mapping method and apparatus of a look-up table used in an imaging system. The look-up table reduces memory size.

It is another object of the present invention to provide a mapping method and apparatus of the look-up table in a high-speed scanner. Mapping task with the look-up table is implemented without double period-reading or value-reading.

It is yet an object of the present invention to provide a method and apparatus of mapping in a scanner. Those least significant bits in a digital signal can contribute to an output signal through the look-up table.

In the present invention, a mapping method and apparatus of look-up table in an imaging system is provided. The mapping method implemented by the apparatus comprises receiving a digital signal having a high-bit portion and a low-bit portion. The high-bit portion of the digital signal is subjected to a curve table for look-up mapping to get a high-bit signal. The partial high-bit portion is subjected to a slope table for getting a factor. The low-bit portion of the digital signal is calculated with the factor to get a low-bit signal. The high-bit signal is combined with the low-bit signal to get an output signal. The curve table and slope curve can reduce the memory usage of the imaging system.

BRIEF DESCRIPTION OF THE DRAWINGS

A better understanding of the invention may be derived by reading the following detailed description with reference to the accompanying drawing wherein.

DESCRIPTION OF THE PREFERRED EMBODIMENT

The semiconductor devices of the present invention are applicable to a board range of semiconductor devices and can be fabricated from a variety of semiconductor materials. While the invention is described in terms of a single preferred embodiment, those skilled in the art will recognize that many steps described below can be altered without departing from the spirit and scope of the invention.

Furthermore, shown is a representative portion of a semiconductor structure of the present invention in enlarged, cross-sections of the two dimensional views at several stages of fabrication. The drawings are not necessarily to scale, as the thickness of the various layers are shown for clarity of illustration and should not be interpreted in a limiting sense. Accordingly, these regions will have dimensions, including length, width and depth, when fabricated in an actual device.

In the present invention, a mapping method and apparatus of look-up table in an imaging system is provided. The mapping method implemented by the apparatus comprises receiving a digital signal having a high-bit portion and a low-bit portion. The high-bit portion of the digital signal is subjected to a curve table for look-up mapping to get a high-bit signal. The partial high-bit portion is subjected to a slope table for getting a factor. The low-bit portion of the digital signal is calculated with the factor to get a low-bit signal. The high-bit signal is combined with the low-bit signal to get an output signal. The curve table and slope curve can reduce the memory usage of the imaging system.

Figure 1:
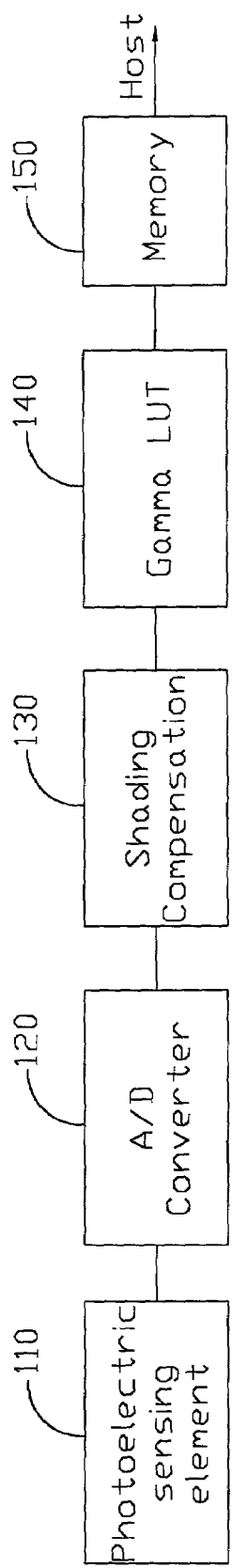
FIG. 1 is a flow chart of image data captured by a conventional imaging system.
Figure 2:
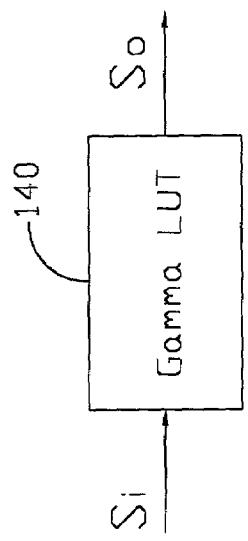
FIG. 2 is a schematic diagram illustrating a look-up table in the conventional imaging system in accordance with the prior art.
Figure 3:
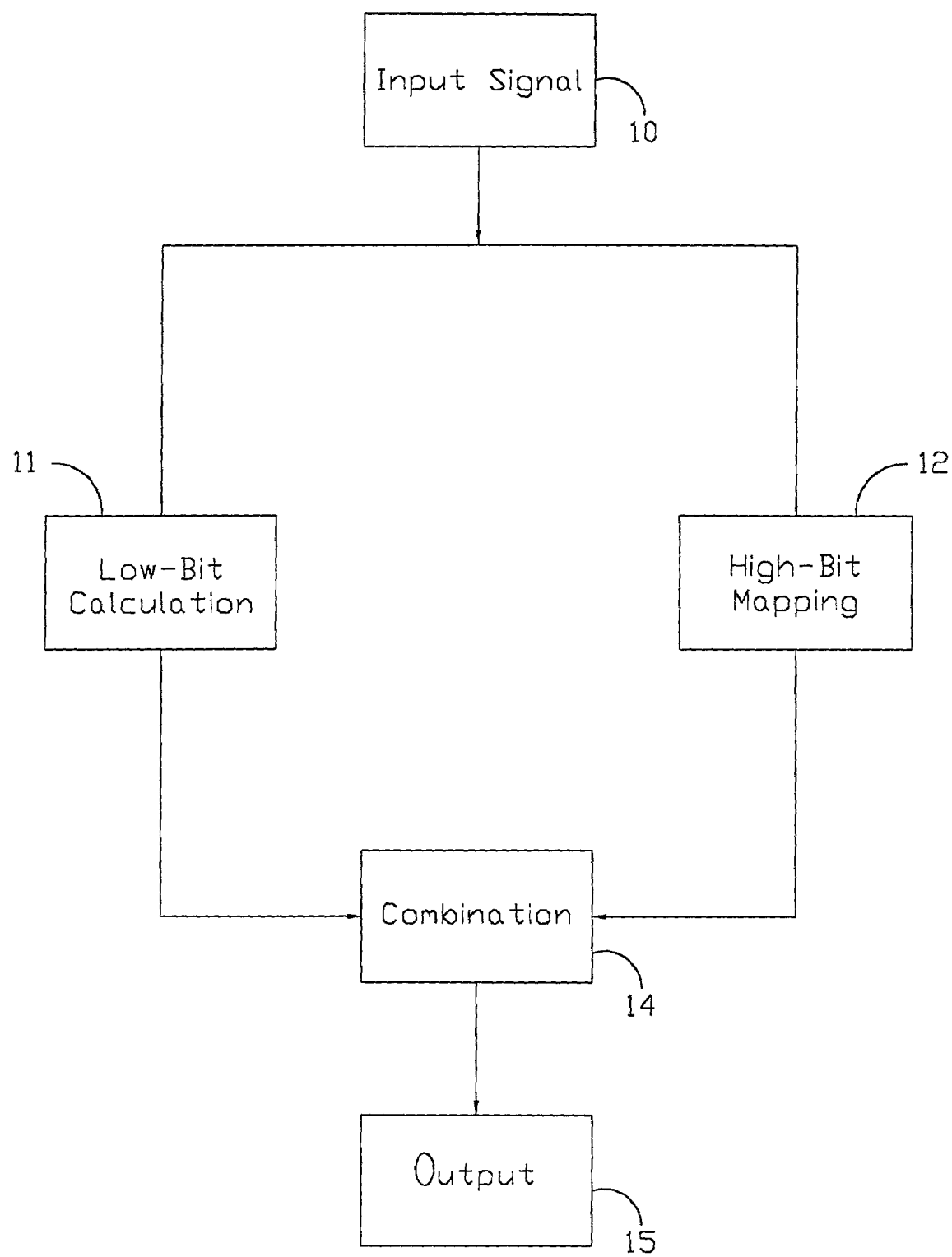
FIG. 3 is a schematic flow chart illustrating a series of steps in accordance with the present invention.

FIG. 3 is a schematic flow chart illustrating a series of steps in accordance with the present invention. A digital signal containing image information is provided (step 10). The digital signal generally consists of most significant bit (MSB) and least significant bit (LSB). The MSB portion of the digital signal is subjected to the procedure of high-bit mapping (step 12). On the other hand, the LSB portion of the digital signal and the partial MSB portion are subjected to the low-bit calculation (step 11). The signal from the high-bit mapping is then combined with one from the low-bit calculation (step 14). The signal from the combined procedure is outputted to a host computer for imaging processing (step 15). These steps of the present invention may be implemented by either hardware or software device.

Figure 4:
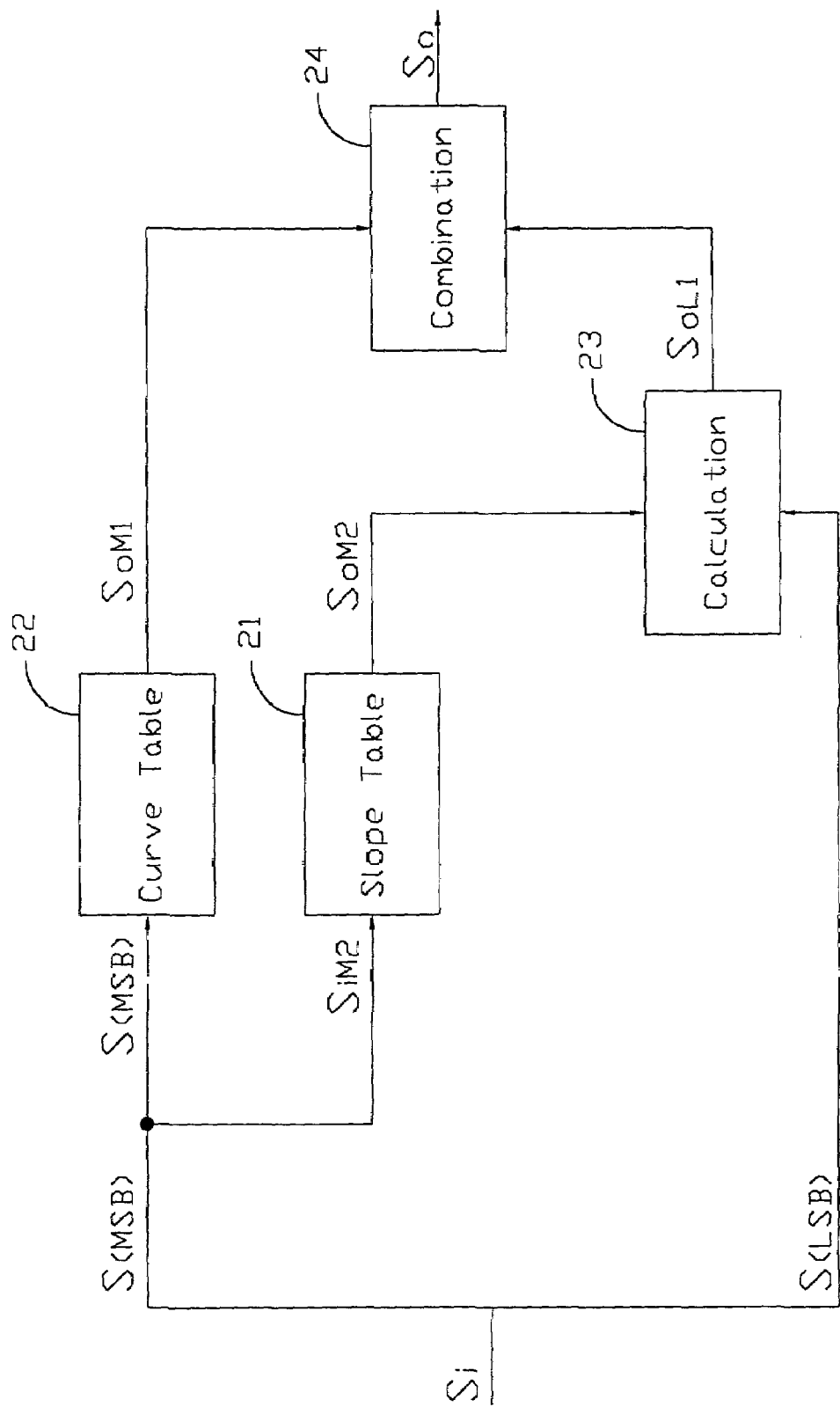
FIG. 4 is a schematic diagram illustrating an embodiment implemented by hardware devices in accordance with the present invention.

FIG. 4 is a schematic diagram illustrating an embodiment implemented by hardware devices, such as memory and peripheral circuits. In the embodiment, a curve table 22 and a slope table 21 are stored in memory devices, such as read only memory (ROM) or random access memory (RAM). Calculation circuits, such as combination of adders or multipliers may achieve calculation zone 23 and combination zone 24.

A multi-bit digital signal $S_i$ is divided into MSB portion $S_{(MSB)}$ and LSB portion $S_{(LSB)}$. The $S_{(MSB)}$ consists of several bits including most signification bit, while $S_{(LSB)}$ consists of several bits including least signification bit. In the embodiment, the $S_1$ is a 16-bit signal and the $S_{(MSB)}$ is an 8-bit signal that is similar to the $S_{(LSB)}$. First, the $S_{(MSB)}$ is transferred into the curve table 22 for mapping. The values of default gamma curve are stored in the curve table 22 for mapping with the $S_{(MSB)}$ and then a signal $S_{OM1}$ is outputted from the mapping of the $S_{(MSB)}$ with the values in the curve table 22. The gamma curve may be user-dependent for specific requirement. The number of bit in the $S_{OM1}$ is as same as one in the $S_{(MSB)}$. Alternatively, the $S_{OM1}$ may have the number of bit different from the $S_{(MSB)}$ does, such as a 16-bit signal for higher precision. In the embodiment, the $S_{OM1}$ is an 8-bit signal.

On the other hand, the signal $S_{iM2}$, derived from the partial bits of the $S_{(MSB)}$, is subjected to the slope table 21 for outputting multiplier factor $S_{OM2}$ of the $S_{(LSB)}$. In the embodiment, the signal $S_{iM2}$ is a 3-bit signal, while the multiplier factor $S_{OM2}$ is 8 bit. The slope table 21 is a set of slope values derived from the gamma curve in the curve table. Those slope values are achieved by dividing the gamma curve into several differential zones. The number of the differential zones depends on the slope variation of the gamma curve and the number of turning points in the gamma curve. The more the number of the differential zones, the more precise the multiplier factor $S_{OM2}$ is. Furthermore, the slope values may be positive or negative, that depends on the gamma curve. Thus, the multiplier factors may also be positive or negative.

The $S_{(LSB)}$ is done by multiplication with the multiplier factor $S_{OM2}$ in calculation zone 23 and is outputted as a signal $S_{OL1}$. In the embodiment, the $S_{OL1}$ is an 8-bit signal. Next, the $S_{OL1}$ is added to the $S_{OM1}$ in the combination zone 24. The output signal So with 16 bit is from the combination zone 24 and for the subsequent host computer.

There are several advantages when applying the present invention. First, using the present invention may reduce the memory size of the look-up table. It is because the slope table consumes less memory size. Compared with conventional one-step or two-step methods of look-up table, the memory size of the present invention is about half of the two conventional methods. In response to bit increase of an input or output signal, the present invention may save the memory size beyond 1 mega bits. Second, the values in the slope table may be dynamically varied with respect to the gamma curve in the curve table and be predetermined in accordance with the user's setting. Further, the present invention reduces the time of mapping look-up table, which only has one mapping task of the curve table (look-up table) at a time instead of conventional two times. Accordingly, it can be applied to a high-speed imaging system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus comprising:
   high-bit mapping means responsive to a digital signal for mapping a high-bit portion of said digital signal to provide a high-bit signal:
   low-bit calculation means responsive to said digital signal for determining a low-bit portion of said digital signal:
   combination means for combining said high-but signal with said low-bit signal to provide an output signal to a controller, wherein said low-bit calculation means further comprises:
   zone-factor mapping means for providing a factor based, at least in part, on a mapping of a portion of said high-bit portion with a slope table; and
   calculation means for multiplying said factor with said low-bit portion, wherein said slope table comprises a plurality of slope values that are calculated by differentiating a gamma curve stored in said high-bit mapping means.

2. An apparatus comprising:
   high-bit mapping means responsive to a digital signal for mapping a high-bit portion of said digital signal to provide a high-bit signal;
   low-bit calculation means responsive to said digital signal for determining a low-bit portion of said digital signal; and
   combination means for combining said high-but signal with said low-bit signal to provide an output signal to a controller, wherein said low-bit calculation means further comprises:
   zone-factor mapping means for determining a factor based, at least in part, on mapping of a portion of said high-bit portion with a slope table; and
   calculation means for multiplying said factor with said low-bit portion, wherein said slope table comprises a plurality of slope values that are calculated by differentiating a gamma curve stored in said high-bit mapping means, wherein said gamma curve is divided into a plurality of differential zones associated with said slope values.

3. An apparatus, comprising:
   a scanner to provide a digital signal;
   high-bit mapping means responsive to said digital signal for mapping a high-bit portion of said digital signal to provide a high-bit signal;

low-bit calculation means responsive to said digital signal for determining a low-bit portion of said digital signal; and combination means for combining said high-bit signal with said low-bit signal to provide an output signal to a controller.

4. A memory device for use in an imaging system, said memory device having stored thereon instructions that, when executed, results in:

mapping a high-bit portion of a digital signal having a high-bit portion and a low-bit portion to a curve table to provide a high-bit signal;

mapping at least a portion of said high-bit portion to a slope table to provide a factor;

determining a low-bit signal based at least in part on said low-bit portion and said factor;

combining said high-bit signal with said low-bit signal to Provide an output signal, wherein said mapping at least a portion of said high-bit portion further comprises:

accessing a curve divided into a plurality of differential zones, said curve related to a plurality of mapping values in said curve table;

generating a plurality of slope values according to said differential zones; and storing said slope values in said slope table for mapping a portion of said high-bit portion, wherein said curve comprises a gamma curve for gamma correction of said imaging system.

* * * * *